Feb. 21, 1967    J. HENRY-BAUDOT    3,304,598
METHOD OF MAKING AN AXIAL AIRGAP ELECTRIC MACHINE
Filed Feb. 14, 1961    3 Sheets-Sheet 1

Feb. 21, 1967  J. HENRY-BAUDOT  3,304,598
METHOD OF MAKING AN AXIAL AIRGAP ELECTRIC MACHINE
Filed Feb. 14, 1961  3 Sheets-Sheet 2

United States Patent Office 3,304,598
Patented Feb. 21, 1967

3,304,598
METHOD OF MAKING AN AXIAL AIRGAP ELECTRIC MACHINE
Jacques Henry-Baudot, Antony, France, assignor to Printed Motors Inc., New York, N.Y.
Filed Feb. 14, 1961, Ser. No. 89,228
Claims priority, application France, Feb. 25, 1960, 819,800, Patent 1,257,857
5 Claims. (Cl. 29—155.5)

The present invention concerns improvements in or relating to axial airgap electric rotary machines made of combinations of disc-shaped members and is mainly concerned with such machines wherein the armature windings are made of flat conductors intimately adhering on both faces of a dielectric sheet over which they are distributed in two sets of half-turn conductors which are connected by face-to-face connections for defining the complete pattern of the windings.

It is the object of the invention to so provide an embodiment of such machines that both simplifies the assembly of their component parts and ensures a full efficiency of the inductor parts thereof.

Machines of the above-defined kind include at least one planar disc-shaped armature introduced within an airgap delineated by two magnetic rings one of which at least includes inductor magnetic poles, either protruding or flush, uniformly distributed around the ring. By reason of the geometry of such members, the assembly is often difficult and, further, the magnetization process of the inductor member must be made after the assembly, with the airgap established and the armature winding disc in its proper location in said airgap. For an optimum efficiency of the machine, it would be highly desirable to ensure the magnetization of said inductor up to the complete saturation of the magnetic material of the poles and with a zero airgap; such condition is not presently met.

In contradistinction thereto, such a condition is possible and the assembly greatly facilitated by providing, in accordance with the invention, each magnetic member included in the stator part of the machine, inductor member included, in two half-shells each of which comprises two half-ring members, which half-shells are first placed in relative contact for magnetization with a nil or zero airgap of the inductor poles therein up to magnetic saturation and thereafter are drawn apart to the required spacing in the final assembly and united by spacing struts, such operation being separately made for each one of the two sets of half-rings entering in the structure of said half-shells. In order to duly preserve the magnetization, each half-ring which presents inductor poles has said poles radially slotted and each half-ring is terminated at both ends by a half-pole, the number of slotted poles being an integer between said end half-poles of the ring.

Such half-shell members may then be stacked and handled according to the requirements and, for the assembly of a machine, two half-shells will be merely brought into proper location for enclosing the armature disc-shaped member within the airgap defined by the struts and for closing the magnetic circuits of the inductor in the machine as they are then applied against one another by their diametral planes.

For a more detailed description of the invention, reference is made to the accompanying drawings, wherein.

Figure 1:
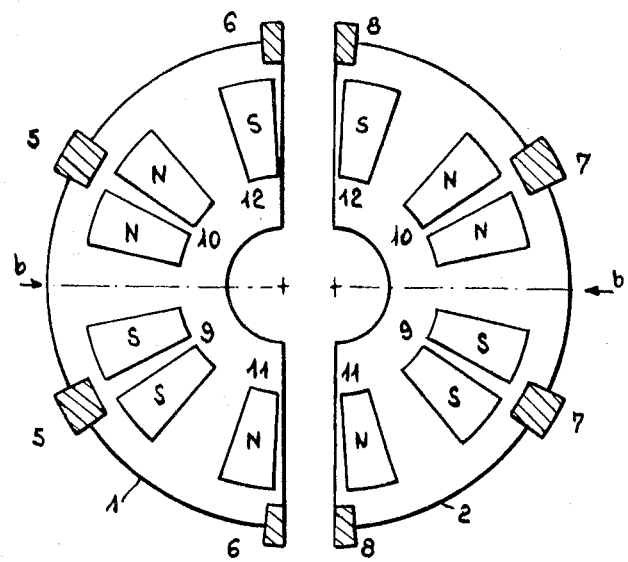
FIG. 1 shows two half-rings of two half-shells, according to the cross-section a—a of FIG. 3.
Figure 2:
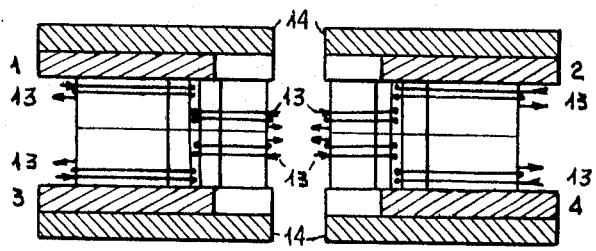
FIG. 2 shows said half-rings in relative contact, in each half-shell, for magnetization up to saturation with zero airgap of the inductor poles they present, which are protruding poles then carrying temporary windings for such an operation of magnetization of the inductor.
Figure 5:
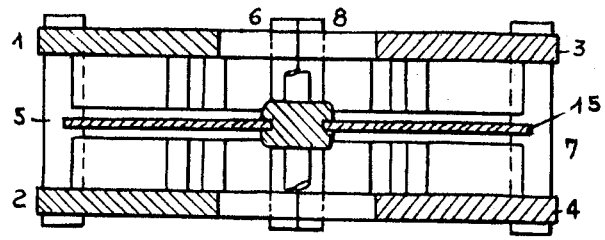
FIG. 5 shows the two half-shells enclosing the rotor armature.
Figure 6:
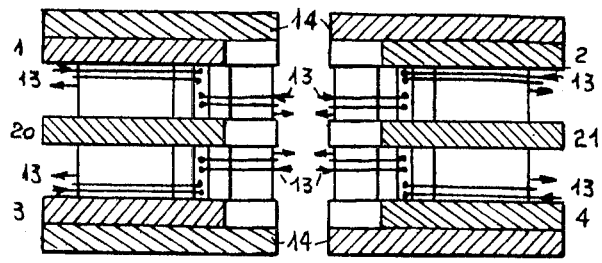
Figure 7:
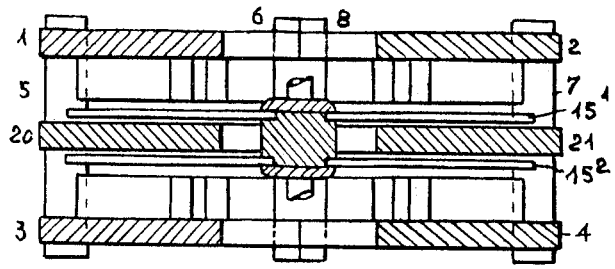
Figure 8:
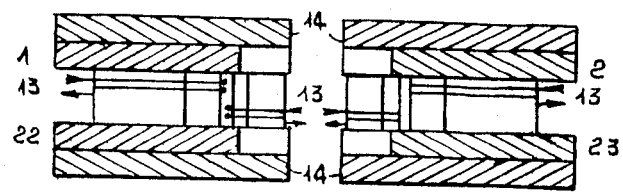
Figure 9:
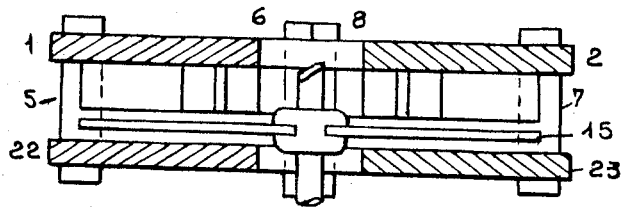
Figure 10:
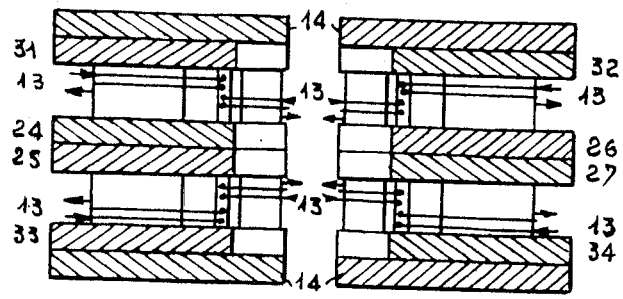
Figure 11:
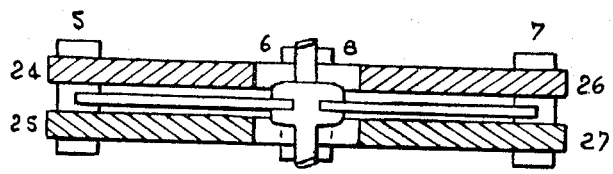

FIGS. 1 to 5 relate to an embodiment wherein the stator comprises two rings of inductor poles delineating the armature airgap in the machine;

FIG. 6 shows the half-rings of inductor poles contacting a half-magnetic ring yoke for magnetization up to saturation at zero airgap of an inductor in a machine having two airgaps;

FIG. 7 shows the assembly with two armatures resulting from the structure of magnetic inductor circuit of FIG. 6;

FIGS. 8 and 9 respectively show arrangements similar to those of FIGS. 2 and 5 for obtaining a magnetic circuit comprising only a single ring of inductor poles and a magnetic ring yoke on either side of the armature;

FIGS. 10 and 11 respectively show arrangements comparable with those of FIGS. 2 and 5 but adapted to machines wherein the inductor poles are "flush" with the magnetic yokes in that they are formed by locally magnetizing rings of a highly remanent and coercive material such as a hard ferrite; the production of such inductor poles having recourse to a temporary application of half-rings of protruding inductor poles, as shown in FIG. 10.

Referring first to FIGS. 1 to 5, one half-shell comprises half-rings wherein the magnetic yokes are 1 and 3, facing each other and spaced apart by struts such as 5 and 6. The other half-shell comprises half-rings wherein the magnetic yokes are 2 and 4, facing each other and spaced apart by struts such as 7 and 8, FIGS. 1, 3 and 5. Each half-ring carries two inductor poles 9 and 10 which are slotted and two half-poles 11 and 12. These latter are level with the radial edges of the half-rings. In a given half-shell which includes two half-rings facing each other, the magnetic polarities of the poles and half-poles in one half ring are opposite from those in the other half ring. When the half-shells are assembled together, it results in two rings of inductor poles such as one can foresee by applying the two half-rings of FIG. 1 until their diametral edges coapt or fit together. The number of poles shown in the drawing is of course merely illustrative.

The two half-rings in a half-shell are first placed in contact, FIG. 2 after the temporary magnetization windings have been set in place around the poles as indicated at 13 in FIGURE 2. Additional magnetic plates 14 are applied over the yokes 1 to 4 in order to avoid the saturation of said yokes during the magnetization process of the inductor poles. Said process consists of delivering an electrical current to the temporary windings in series, such winding comprising a small number of turns of relatively large cross-section wire. Since the pole faces of one half-ring are in contact with the pole faces of the other half-ring, the process of magnetization to saturation is consequently effected with a zero airgap.

Figure 3:
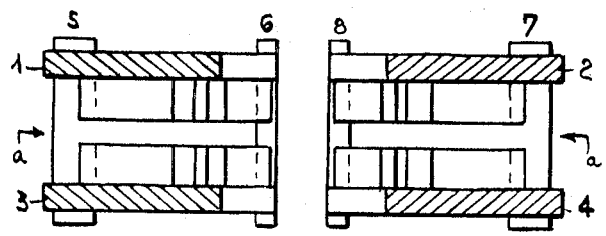
FIG. 3 shows the two half-shells obtained after such magnetization operation is effected, according to the cross-section b—b of FIG. 1.

After the magnetization is made in each temporary assembly of FIG. 2, the plates 14 are removed and the inductor members are drawn apart in a manner in which they remain facing each other, until the required spacing is obtained and the struts such as 5, 6, 7 and 8 are mounted at the places shown. Then the magnetization windings are removed and the half-shells are as shown in FIG. 3 are ready for assembly of the rotor member therein.

Figure 4:
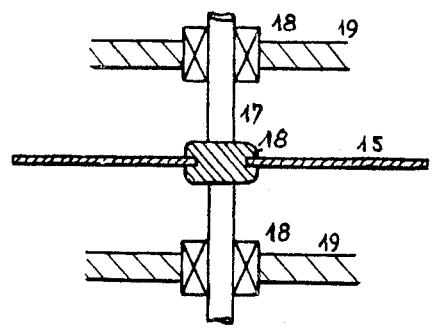
FIG. 4 shows a lateral view of the rotor armature provided with its bearings with a disc armature adapted to the airgap of the half-shells of FIG. 3.

The rotor part of the machine has been prepared, as shown in FIG. 4 and comprises a disc-shaped winding member 15 mounted on a hub 16 secured to the shaft 17. Said shaft is mounted in bearings 18 of mounting plates 19 parts of which only are shown on the drawing. It then suffices to encase the rotor disc-member by the two previously formed half-shells, the assembly of the rotor and stator parts of the machine being shown in FIGURE 5. The half-shells will be secured to the machine frame in a suitable manner, not otherwise shown. The brushes bearing on the disc-shaped winding may have been mounted either on the rotor assembly of FIG. 4 or after the assembly of FIG. 5 is made, by passing such mounting between the struts.

A machine of this kind may necessitate a multiple member armature. In such a case, in order not to unduly widen the airgap, fixed magnetic discs may advantageously be inserted between the armature members. When putting the present invention into practice, each one of such magnetic discs will enter in the structure of the half-shells, being made of two half-discs, one for each half-shell. For a two armature machine, for instance, such a pair of half-magnetic discs 20, 21, are inserted, FIG. 6, between the rings of poles during the magnetization processing of said poles so that, in this case also, the saturation magnetization is made with zero airgaps. Then the members are drawn apart as explained and strutted, so that the final stator and rotor assembly is such as shown in FIG. 7. In said FIG. 7, the disc armatures are shown at $15^1$ and $15^2$.

A machine of this kind may also comprise only one inductor pole ring, the other member of the stator being a mere magnetic yoke for the closure of the magnetic flux lines on the side of the rotor opposite to that of the inductor ring. Such a simplified assembly is obtained, as shown in FIGS. 8 and 9, by merely substituting two half-yokes 22 and 23 for one pair of half inductor rings in the shells.

It is further known that a machine of this kind may use for its inductor part, ferrite material rings, i.e. rings of a material of high coercivity, wherein magnetic poles have been impressed by localized magnetization. For putting the invention into practice in such a case, the half-rings of ferrite material are arranged in contact, as shown at 24–25 and 26–27 in FIG. 10, and the protruding poles of additional half-rings, the yokes of which are shown at 31–33 and 32–34 are applied against the exposed faces of the ferrite half-rings. Thereafter, through the energization of windings 13 on the protruding poles, the magnetization process is carried up to saturation in contact on the half-rings of ferrite so that the required inductor poles are impressed therein. After magnetization, the additional members are removed and the ferrite half-rings drawn apart to the required spacing and assembled by the struts as in the previously described cases.

Further alternatives to those which have been described may be now contemplated without further description. For instance, it is obvious that, whereas a division of the magnetic circuit into two halves suffices, for the purposes of the invention, a division into more than two parts of the magnetic structure may be contemplated if required without departing from the scope of the invention.

What is claimed is:

1. A method of making a rotor and stator assembly for an axial airgap electric rotary machine comprising at least one disc-shaped armature encased between a pair of magnetic stator disc-shaped members at least one of which carries a ring of inductor poles presenting flat pole areas in a common plane, comprising the steps of: forming at least two sectoral partial shells, each including sectors of the stator members spaced apart by the required axial airgap interval, each sectoral part of the ring of inductor poles in said shells comprising a number of poles which number is an integer plus two half-poles terminating at substantially the radial edges thereof; assembling the disc-shaped armature on its shaft, and encasing said armature by the said sectoral partial shells brought together along their radial edges.

2. A method according to claim 1, wherein the forming of each sector partial shell comprises the steps of forming two sectors of ring members of the stator, bringing said sectors together with the pole areas of one sector in contact with the pole areas of the other sector, magnetizing up to saturation the magnetic poles therein, drawing apart said sectors without changing their relative orientation and uniting said spaced sectors by spacing members at the required airgap interval.

3. A method according to claim 2, wherein during the magnetization step, sectors of magnetic material are applied on both outer faces of the stator partial members for preserving from saturation the magnetic yoke parts in said members and confining saturation to the magnetic poles proper.

4. A method according to claim 2 for making a machine comprising a plurality of axial airgaps and armatures, wherein sector magnetic plates for defining the said airgaps are inserted between the two sectors of ring members, the magnetization step being made onto such a composite assembly of contacting parts, whereafter, said parts are drawn apart to their relative required spacings and, after removal of said magnetic plates, are united by said spacing members.

5. A method according to claim 2 for making a machine the inductor poles of which are impressed in a ferrite material, wherein a protruding pole magnetic sector is applied onto the exposed face of any sector of ferrite and magnetization up to saturation is effected on said protruding poles whereby the corresponding inductor poles are impressed in the ferrite, and thereafter removing said protruding pole sector from the sectoral partial shell.

References Cited by the Examiner

UNITED STATES PATENTS

| | | | |
|---|---|---|---|
| 559,584 | 5/1896 | Kelly et al. | 310—168 |
| 570,914 | 11/1896 | Dorman | 310—268 X |
| 2,483,024 | 9/1949 | Roters | 29—155.53 |
| 2,763,916 | 9/1956 | Korski | 29—155.53 |
| 2,970,238 | 1/1961 | Swiggett | 310—268 |
| 3,008,062 | 11/1961 | Kober | 310—268 |
| 3,072,814 | 1/1963 | Moressee et al. | 310—268 |
| 3,090,880 | 5/1963 | Raymond | 310—268 |
| 3,118,076 | 1/1964 | Held | 310—268 X |

JOHN F. CAMPBELL, *Primary Examiner.*

MILTON O. HIRSHFIELD, *Examiner.*

G. P. HAAS, J. W. BOCK, R. W. CHURCH,
*Assistant Examiners.*